United States Patent [19]

McElroy

[11] Patent Number: 5,165,730
[45] Date of Patent: Nov. 24, 1992

[54] DUCT JOINING SYSTEM

[76] Inventor: Howard J. McElroy, 1770 Sherbrook Dr. NW., Cedar Rapids, Iowa 52402

[21] Appl. No.: 722,280

[22] Filed: Jun. 27, 1991

[51] Int. Cl.⁵ ............................................. F16L 35/00
[52] U.S. Cl. .................................... 285/39; 285/328; 285/363; 285/424; 285/405; 29/513
[58] Field of Search ................. 285/39, 363, 364, 405, 285/406, 424, 906, 328, 405; 29/432, 513

[56] References Cited

U.S. PATENT DOCUMENTS

| | | | |
|---|---|---|---|
| 913,685 | 3/1909 | Boyd | 285/405 |
| 2,396,030 | 3/1946 | Terry | 285/405 |
| 3,712,649 | 1/1973 | Martin | 285/424 |
| 3,923,326 | 12/1975 | Mez | 285/424 |
| 4,123,094 | 10/1978 | Smitka | 285/424 |
| 4,479,288 | 10/1984 | Jones | 285/425 |
| 4,542,923 | 9/1945 | La Crosse et al. | 285/424 |
| 4,552,388 | 11/1985 | Meinig | 285/424 |
| 4,636,105 | 1/1987 | Johansson | 285/424 |
| 5,069,484 | 12/1991 | McElroy | 285/424 |

*Primary Examiner*—Eric K. Nicholson
*Attorney, Agent, or Firm*—James C. Nemmers

[57] ABSTRACT

A duct joining system having two L-shaped connectors for each duct corner. Each connector has two substantially perpendicular legs forming a corner region and has an inside and an outside surface with the outside surface of one L-shaped connector abutting the outside surface of the other L-shaped connector when the ducts are joined. An irregularly shaped opening is formed in the corner region of each L-shaped connector in alignment with the opening in the abutting connector. A tab having an enlarged head and a stem is integrally formed with and extends inwardly from the peripheral edge of each of the openings. A score line is formed at the base of the stem of each tab on the outside surface of the connector to allow the tab to be bent outwardly about the score line so that the tab can be inserted through the opening in the abutting L-shaped connector and than bent over to lock the connectors together.

9 Claims, 4 Drawing Sheets

U.S. Patent  Nov. 24, 1992  Sheet 1 of 4  5,165,730
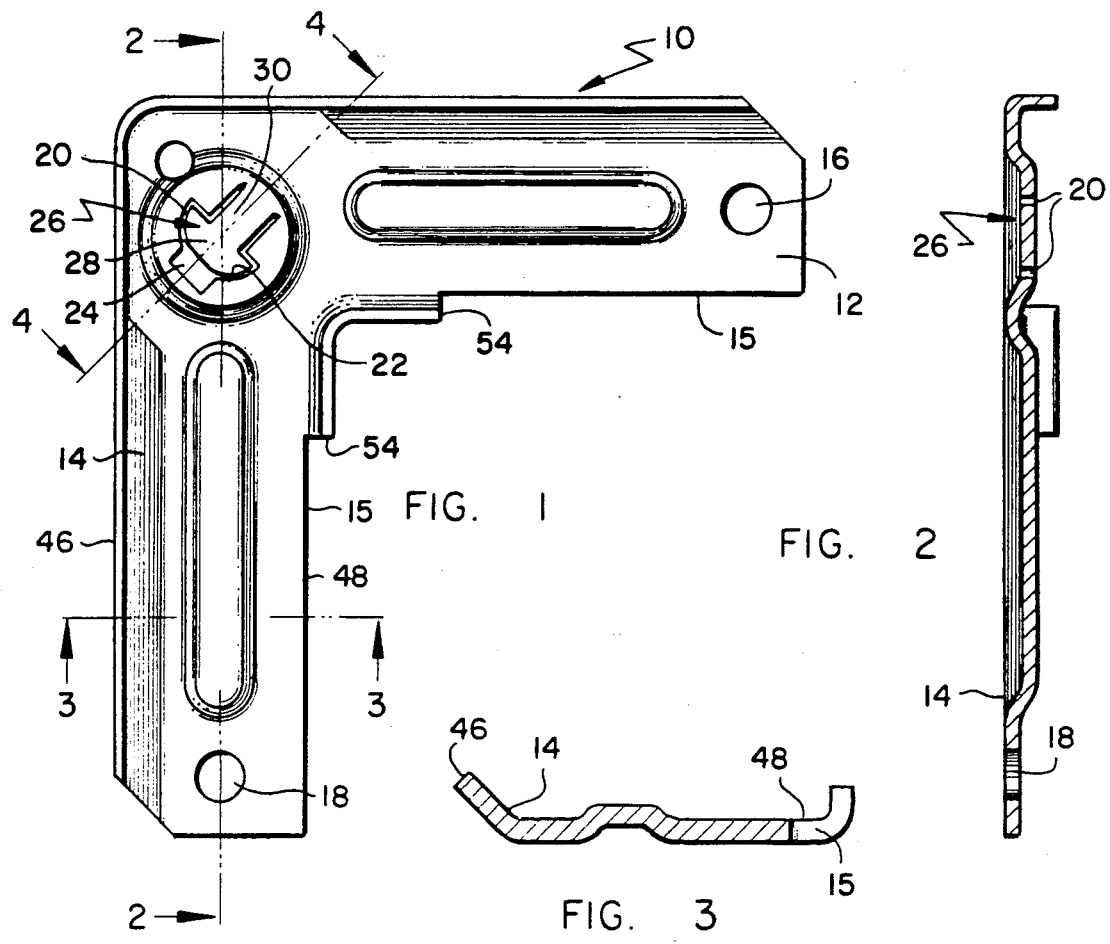
FIG. 1
FIG. 2
FIG. 3
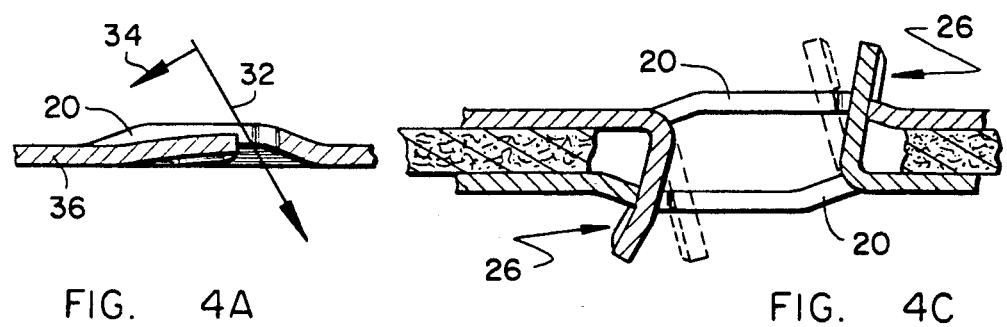
FIG. 4A
FIG. 4C
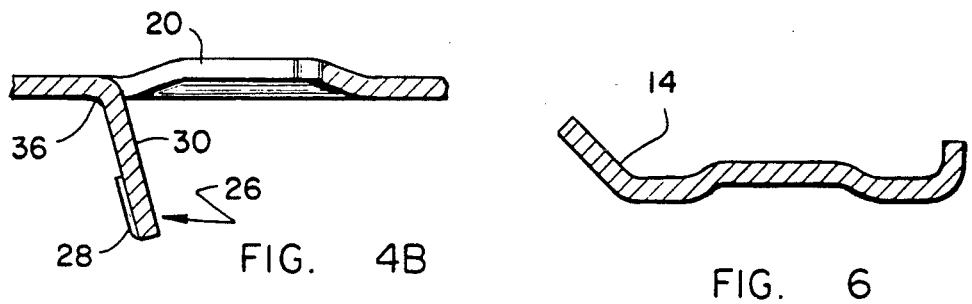
FIG. 4B
FIG. 6

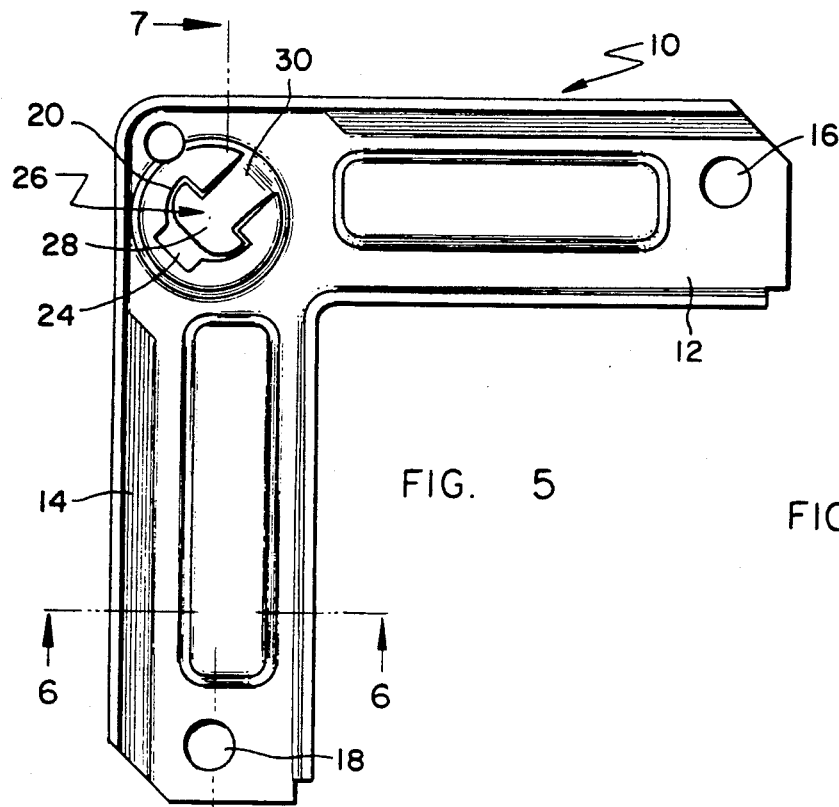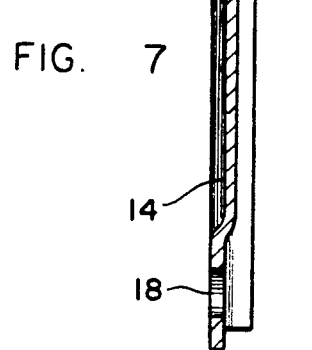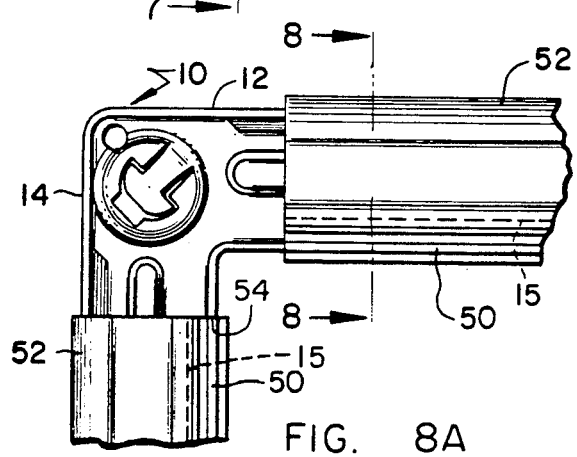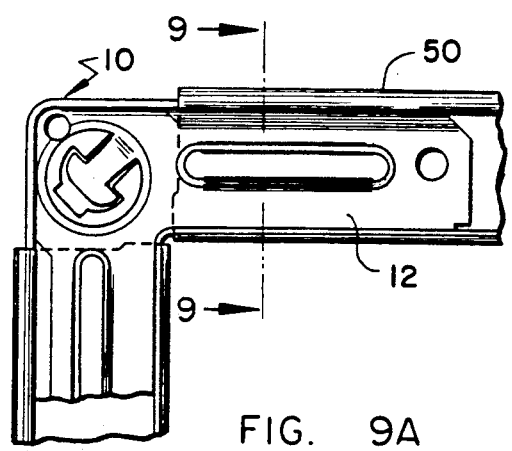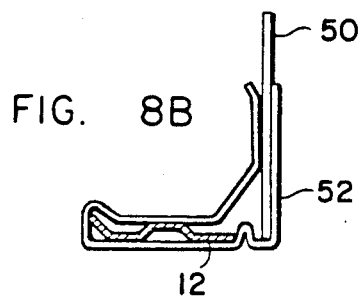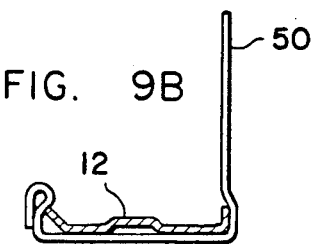

DUCT JOINING SYSTEM

BACKGROUND OF THE INVENTION

The invention relates generally to duct joining systems used in the heating, ventilating and/or air conditioning field that have ducts typically rectangular in cross-section. More particularly, the invention relates to an L-shaped connector used in fastening adjacent duct pieces together and a method for fastening adjacent ducts using these L-shaped connectors.

Duct joining systems are well known in the art and generally are utilized to join together the ends of adjacent duct sections such as heating and air conditioning ducts or the like. Such systems typically include couplers respectively fastened to the end edges of each of the walls forming the duct. In a general sense, each of the couplers is defined by an elongated channel adjacent each corner and an L-shaped corner connector with each leg coupled to one of the elongated channels adjacent each corner. When two of the L-shaped corner connectors, and thus the duct ends, are brought together in an abutting relationship, they can be attached together thus attaching the ends of the ducts together. Representative prior art illustrating such type of construction include: my copending U.S. patent application Ser. No. 478,238, filed Feb. 9, 1990, entitled "Duct Joining System" now U.S. Pat. No. 5,069,484; U.S. Pat. No. 4,636,105, Johansson, issued Jan. 13, 1987; U.S. Pat. No. 4,558,892, Daw et. al., issued Dec. 17, 1985, U.S. Pat. No. 4,542,923, La Crosse et. al., issued Sept. 24, 1985; and U.S. Pat. No. 3,199,901, Jeppsson, issued Aug. 10, 1965.

The system disclosed in my co-pending patent application is an excellent system designed for use with duct rated for low pressure applications, but it may have limited use in high pressure applications. Each of the other prior art systems have some disadvantage, such as, the ineffectiveness of the assembly system, the cost of manufacture, the cost of installation, or the difficulty in installation. Obviously, when the amount of time required to install the L-shaped connectors increases, the cost of the job increases. Thus, it is important to provide a system for interconnecting ducts that provides connecting elements that are economical and simple to manufacture, and that are easily and quickly installed to complete the installation.

The present system provides a new and unique L-shaped corner connector design that permits the boltless connectors to be quickly, easily and positively locked to each other resulting in a connection that is strong enough for all ducts, regardless of the pressure rating. Also, the system of the invention is useable in either an integral flange duct system or in a slip-on or picture frame flange system. Although the invention obviates the use of a bolt or other type of separate fastener, the design of the invention permits the use of a bolt if desired. Each of the L-shaped connectors has an irregular shaped opening at the juncture of the legs of the connector. This opening is shaped to provide a wide center portion and a narrower slot. A T-shaped tab is integrally formed with and extends inwardly from the peripheral edge of the opening opposite the slot. When a corner connector is reversed in position and placed in superimposed abutting relationship with a second connector, the tabs are on opposing peripheral edges of the openings in the two connectors. This allows the tab on each connector to be inserted through the wider center portion of the opening in the other connector, and then bent over into the slot of the other connector. Because of the T-shape of the tabs, the two connectors will be positively locked together.

A score line may be formed at the base of each tab on the outside surface of the connector to allow the tab to be easily bent over after insertion through the opening of the abutting connector to lock the connectors together.

The novel construction allows for the use of bolt in addition to the locking features of the connector. If bolts are used, the locking tabs can either be cut off or bent out of the way and a bolt installed.

As is well known to those skilled in the art, the legs of each of the L-shaped connectors are flat metal strips the edges of which are turned toward the inside surface to provide stiffening ribs and to aid in attachment to the duct piece when used with either a picture-frame type connecting system or an integrally rolled flange connecting system, both systems being well-known in the art.

Thus, it is an object of the present invention to provide a duct joining system that is effective in achieving an improved coupling in a quick fashion when the duct ends are joined together.

It is also an object of the invention to provide a duct joining system in which no special pins are required to join the duct ends.

It is yet another object of the invention to provide a method of joining duct ends with the use of connectors that lock together in a simple manner without the use of special tools.

It is still another object of the present invention to provide an improved L-shaped connector for use in joining the ends of ducts, including ducts rated for high pressure applications.

SUMMARY OF THE INVENTION

The present invention improves a system for joining two ducts together at each of the corners thereof with first and second L-shaped connectors. In the preferred embodiment, each of the connectors are identical in construction and have an opening in the corner, which opening has a wide center portion and a narrower portion that forms a slot. The L-shaped connectors are positioned in abutting relationship with each other when joining a corner of two ducts. The connectors each have a tab formed with and extending inwardly from the periphery of the opening. When assembled, the tab of a first connector extends through the opening in the second connector, the tab of the opening in the second connector extends through the opening in the first connector and the tabs are bent over into the respective slots to lock the connectors together.

The invention also relates to an improved method of joining two ducts together at the corners thereof with first and second L-shaped connectors. In the preferred method, each of the connectors are identical in construction and have in the corner thereof an opening containing a slot, the L-shaped connectors being in abutting relationship with each other when joining the two ducts. The improved method comprises the steps of integrally forming a tab with and extending inwardly from the periphery of each of the openings, inserting the tab of a first one of the connectors through the opening of the second connector while inserting the tab of the second connector through the opening of the first connector, and bending the tabs into the respective slots to thereby lock the connectors together.

BRIEF DESCRIPTION OF THE DRAWINGS

These and other objects, advantages and features of present invention will be apparent on consideration of the following detailed description thereof taken in conjunction with the accompanying drawings in which like numbers represent like elements and in which:

FIG. 1 is a plan view of the novel L-shaped connector of the present invention designed for heavy duty applications;

FIG. 2 is a cross section of the novel L-shaped connectors of FIG. 1 taken along line 2—2 of FIG. 1;

FIG. 3 is a cross section taken on the line 3—3 of FIG. 1;

FIG. 4A is a partial cross-sectional view of the L-shaped connector of FIG. 1 taken along line 4—4;

FIG. 4B is a cross sectional view of the L-shaped connector as illustrated in FIG. 4A with the tab shown bent outwardly to its engagement position;

FIG. 4C is a partial cross sectional view taken on the line 4C—4C of FIG. 10B and showing two of the L-shaped connectors locked to each other and showing the manner in which the tab from the opening of each of the connectors is bent through and into the slot of the opening of the other connector;

FIG. 5 is a plan view similar to FIG. 1 and showing the L-shaped connector used in applications other than heavy duty;

FIG. 6 is a cross sectional view of one of the legs of the novel L-shaped connector illustrated in FIG. 5 and taken along the section line 6—6 of FIG. 5;

FIG. 7 is a cross section of the novel L-shaped connectors of FIG. 6 taken along line 7—7 of FIG. 6;

FIG. 8A is plan view of the corner portion of an L-shaped connector of the invention and showing slip-on flanges in place on the legs of the connector to join the connector to the walls of the duct;

FIG. 8B is a cross section of a leg of the connector of FIG. 8A taken on the line 8—8 of FIG. 8A;

FIG. 9A is a view similar to FIG. 8A showing an L-shaped connector of the invention in place in the integral flange of a duct;

FIG. 9B is a cross section of a leg of the connector of FIG. 9A taken on the line 9—9 of FIG. 9A;

DETAILED DESCRIPTION OF THE PREFERRED EMBODIMENTS OF THE INVENTION

Figure 10B:
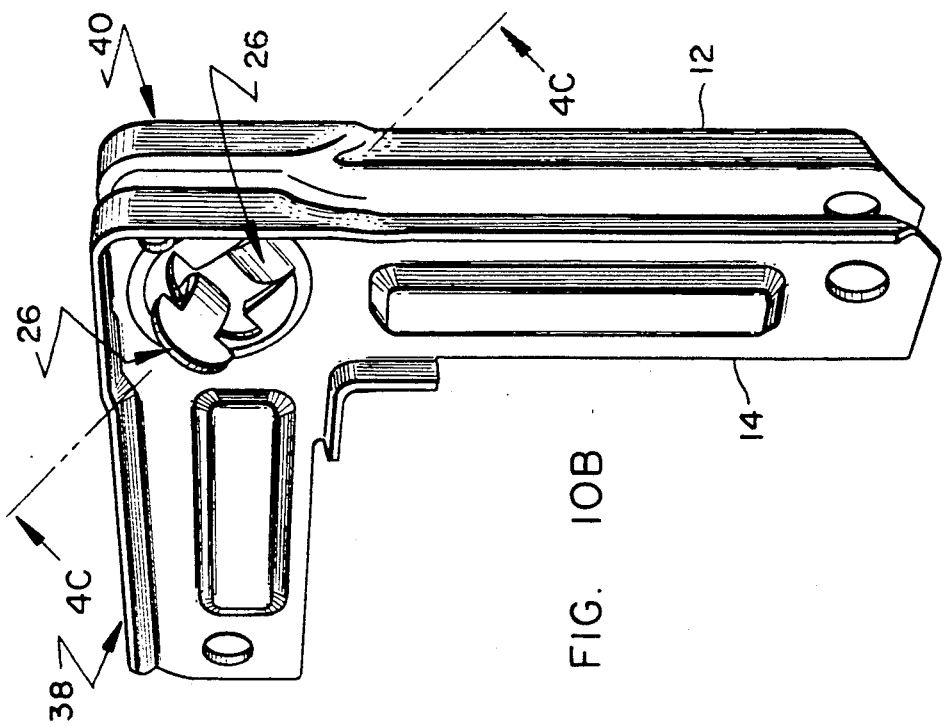
FIG. 10B is a perspective view of the two connectors shown in FIG. 10A after they have been locked together.

FIG. 1 is a plan view of a novel L-shaped connector constructed according to the principles of the present invention and designed for use in heavy duty applications where the ducts will be subjected to higher air pressures. Ducts for these high pressure applications are manufactured from heavier gauge material and to closer tolerances, and may be used also in a slip-on or "picture frame" flange system. The connector is designated generally by the numeral 10 and includes two legs 12 and 14 extending at substantially 90 with respect to each other and forming a corner region at their juncture. When used in a slip-on flange system, the legs 12 and 14 have a cut-out portion 15 along the inner edge which portion 15 extends from the corner region to the outer end of each leg. Openings 16 and 18 are formed in the outer ends of each of the legs 12 and 14, respectively, for use as may be necessary. An opening 20 is formed in the corner region of the L-shaped connector approximately at the intersection of the longitudinal axis of leg 12 and longitudinal axis of leg 14. As shown, the opening 20 is irregular in shape and has a wider central portion 22 and a narrower portion that forms a somewhat rectangular slot 24. A tab 26 is integrally formed with and extends inwardly from a peripheral edge of the opening 20. Tab 26 is formed by cutting the corner region to form opening 20 and displacing the material that forms tab 26 slightly from the plane of the corner region. This is best illustrated in FIG. 2 and 4A. The tab 26 is thus T-shaped, having an enlarged head 28 joined to a stem 30 that is integral with the material in the corner region of the connector. When inserted through the opening 20 and bent behind the slot 24 of an abutting connector, the head 28 of tab 26 provides for the positive locking with the abutting connector as will be explained more fully hereafter.

FIG. 4A is a partial cross-sectional view taken along lines 4—4 of FIG. 1 and illustrates clearly the tab 26 as initially formed. Although when in this position the tab 26 is not in a proper position for engagement with another connector, the tab 26 is preferably left in the initially formed position for ease of shipping and handling and protection of the tab until ready for final installation. If desired, the tab 26 could be bent out of the opening 20 at the time of manufacture into the engagement position shown in FIG. 4B, but it is preferred to leave the tab 26 in the position shown in FIG. 3A for the reasons mentioned. It will be noted in FIG. 4A that a score line 36 is formed at the base of the tab 26. This score line 36 allows the tab 26 to be easily bent out of the opening 20 into the engagement position shown in FIG. 4B and then, after insertion into the opening 20 of an abutting connector, to be bent an additional amount into the position shown in FIG. 4C. The score line 36 also provides a line of rotation so that, upon bending, the tab 26 will extend a predetermined distance consistently from part to part.

In order to accomplish this task in a simple and easy manner, an elongated pin, known in the trade as a drift pin and preferably having a rounded nose, is inserted in the opening 20 in the direction of arrow 32 (see FIG. 4A) so that pressure can be applied to the head 28 of tab 26 and to the edge of the slot 24 of opening 20. By applying force to the drift pin as indicated by the arrow 34 in FIG. 4A, the tab 26 is moved about score line 36 out of the opening 20 to the position shown in FIG. 4B. When the tab 26 has been moved out of the opening 20 as illustrated in FIG. 4B, the tab 26 of one connector 10 ca then be inserted through the wide central portion 22 of the opening 20 of another connector 10 whose tab has been similarly bent to the engagement position shown in FIG. 4B. The drift pin can then be used to force both tabs 26 of the abutting connectors 10 into the locked position illustrated in FIG. 4C. In FIG. 4C the dotted lines show the tabs 26 in the engagement position, and the tabs 26 are shown in full lines in the locked position in which the abutting connectors 10 are positively and securely held together. Thus, moving the tab 26 out of the opening 20 is a simple procedure with the drift pin providing the necessary force, and once the tab is out of the opening 20 and in the engagement position of FIG. 4B, and if two connectors are placed in abutting relationship, each of the tabs 26 extends through the opening of the adjacent connector. By inserting a drift pin as described, both of the tabs 26 are locked into the corresponding slots 22 of the abutting connectors.

FIG. 3 is a cross sectional view of the leg 14 taken along the section line 3—3 of FIG. 1. As can be seen in FIG. 3, the edges 46 and 48 of leg 14 are turned toward the inside of leg 14 to provide stiffening ribs.

Figure 10A:
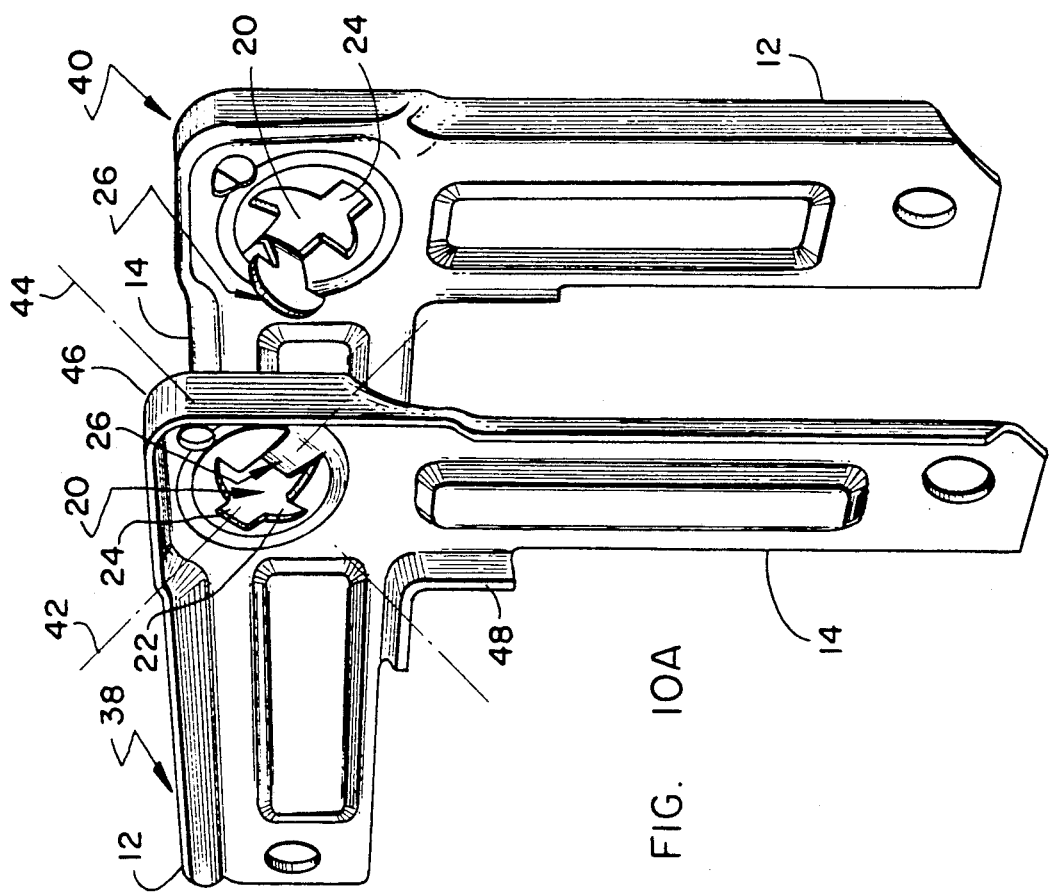
FIG. 10A is a perspective view of two of the heavy duty L-shaped connectors illustrated in FIG. 1 and showing the connectors in side-by-side relationship prior to being joined or locked together and illustrating the tabs bent away from its respective opening and ready for insertion into the opening of the other connector.

FIG. 10A is an isometric view of two of the L-shaped corner connectors 38 and 40 of the preferred embodiment of the present invention in side-by-side relationship before being attached to each other. Connectors 38 and 40 are identical in construction and are placed in a back-to-back relationship with each other, as shown, when they are to be used to join duct sections. As is well know to those skilled in the art, the connectors 10 are first joined to the corners of the duct section before the sections are assembled. As shown in FIG. 10B and as previously explained, when the two L-shaped connectors 38 and 40 ar placed adjacent each other, the tab 26 of one connector 38 will extend through the opening 20 of the other connector 40 and the tab 26 of connector 40 will extend through the opening 20 of connector 38. A drift pin can be then be inserted through the openings 20 to bend the tabs 26 into the slots 24 of the respective adjacent connectors to lock the connectors together thereby connecting the adjacent duct pieces. Thus, FIGS. 10A and 10B illustrate the manner in which the novel construction of the L-shaped connectors 38 and 40 allows the connectors to be locked together in a very simple and quick manner.

It will be noted in FIG. 10A that the tab 26 extends inwardly from the periphery of the opening 20 along an axis 42 that is perpendicular to the line 44 extending from the outer corner 46 of the L-shaped connector to the inner corner 48 of the L-shaped connector. This construction allows the manufacture of a single universal connector which, when inverted and placed on an adjacent duct piece and in an abutting relationship with another connector (as illustrated in FIG. 10A), allows the tab 26 to be bent outwardly to extend through the wider portion 22 of opening 20 and then over the edge of the slot 24 of the abutting connector to lock the connectors together.

Figure 11B:
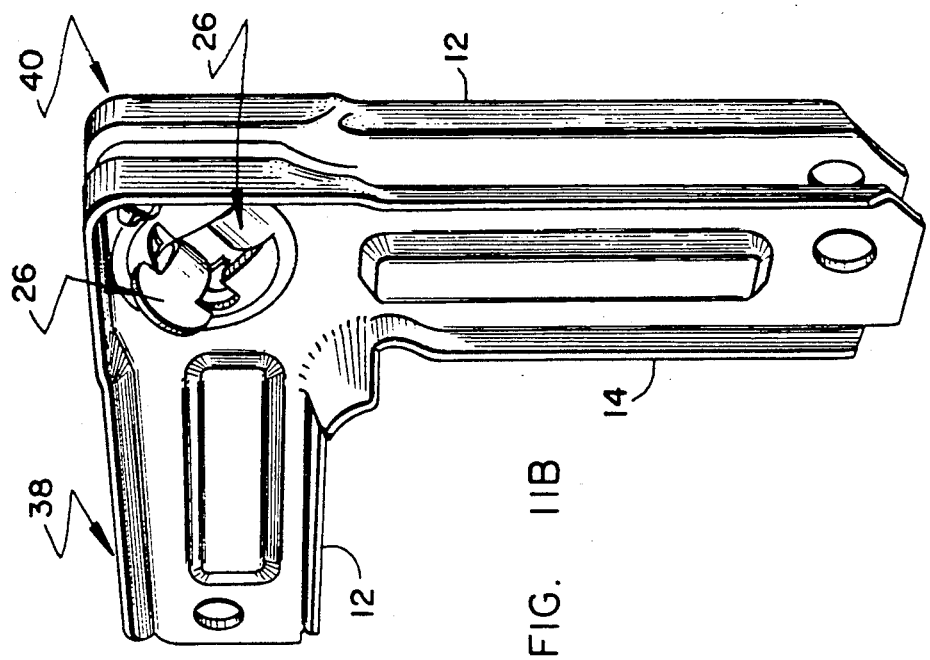
FIG. 11B is a perspective view of the connectors illustrated in FIG. 11A after they have been locked together.
Figure 11A:
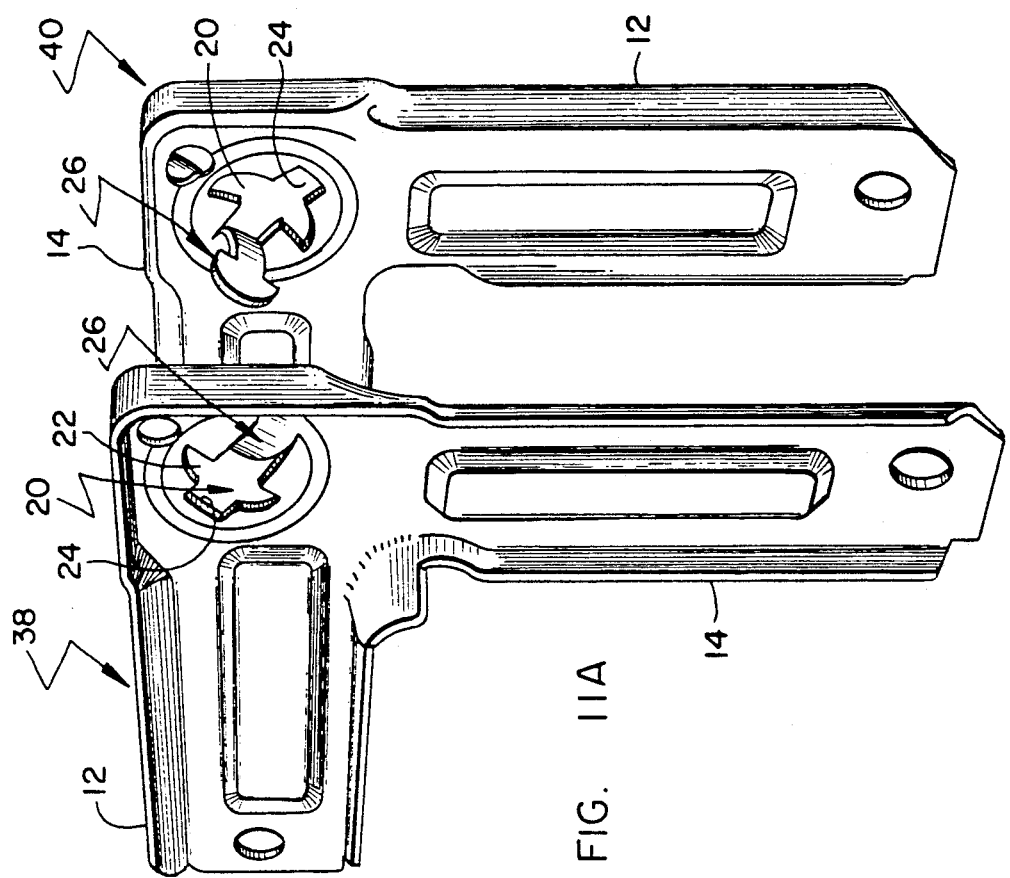
FIG. 11A is a perspective view similar to FIG. 10A and showing the L-shaped connectors of FIG. 6 and their side-by-side relationship prior to being locked together.

FIG. 5 and FIGS. 11A and 11B disclose an alternate embodiment of the invention which is similar to the embodiment shown in FIG. 1 and FIGS. 10A and 10B except that the connectors 10 do not have a cut out portion 25 in each leg 12 and 14. Connectors of this type are designed for use in connecting ducts that have a flange 56 formed integrally with the duct wall 50. This is illustrated in FIGS. 9A and 9B which show the connectors inserted into the flanges 56 until the flanges engage the juncture of the legs 12 and 14 at corner region of the connector.

FIGS. 8A and 8B illustrate the connectors 10 in place when used in a slip-on type flange system. As is well known to those skilled in the art, in this type of system, the duct wall 50 is not formed with an outwardly extending flange. Therefore, a preformed flange 52 is slipped on over the edge of the duct wall 50, and the leg 12 or 14 of a connector 10 is slipped into the space between the legs of the flange 52 until the flange 52 abuts the shoulder 54 formed by the cut out portion 15 in each leg 12 or 14. This is clearly illustrated in FIGS. 8A and 8B. With the connectors 10 in place in the slip-on flanges 52, the connectors can be locked together in the manner previously described.

The system of the invention is much quicker to use than prior art systems because of its simplicity. For instance, in U.S. Pat. No. 4,542,923, tabs extend outwardly from the edges of the L-shaped connector members and each tab must then be hammered over its own connector outer edge and outer edge of the adjacent connector in two different planes in order to hold the connectors together. The connectors of the invention do not require any hammering and simply require a drift pin to snap the tabs in place in locking relationship with the adjacent connector.

If it is desired to use a bolt to lock two connectors together, the tabs 26 can be cut off or bent out of the way and a bolt (not shown) inserted through the openings 20 of two abutting connectors 10 and a nut placed on the bolt and tightened.

Thus, there has been disclosed a novel duct joining system that has two L-shaped connectors for connecting each of the corresponding corners of two adjacent duct pieces. In the preferred, illustrated embodiment, each connector has an inside and an outside surface with the outside surface of one L-shaped connector abutting the outside surface of the other L-shaped connector when the ducts are joined. An irregular shaped opening is formed in the corner of each L-shaped connector in alignment with the opening in an abutting connector. The opening includes a slot, and a tab having a head and a stem is integrally formed with and extends inwardly from the peripheral edge of each of the openings. A score line is formed at the base of the stem of each tab on the outside surface of the connector to allow the tab to bent outwardly about the score line so that it can be inserted through the opening in the abutting L-shaped connector. By further bending the tab until its stem is seated in the slot of the opening of the abutting connector, the connectors are locked together.

The invention has been described in connection with a preferred embodiment, and although the invention has been described only in connection with the preferred embodiment, it will be evident to those skilled in the art that various revisions and modifications can be made to the preferred embodiment described herein without departing from the spirit and scope of the invention. It is my intention, however, that all such revisions and modifications as are obvious to those skilled in the art will be included within the scope of the following claims.

What is claimed is as follows:

1. A method of joining together two ducts each having walls terminating in an open end, the method comprising the steps of: providing a connector for each duct which connector has two legs extending from a central portion with an opening having a slot in the central portion and an integrally formed tab extending away from the opening and the slot, the tab having an enlarged head and a narrower stem; attaching at least one connector to the walls of each duct; placing said duct ends in an abutting relationship such that the connectors on each duct abut each other and the openings in the central portion of each connector are in superimposed relationship with the tab of the connector on one duct extending through the opening in the connector of the other abutting duct; and bending the tab of each connector so that the stem of the tab extends through the slot of the other connector and the head of the tab extends over the edges of the slot in the other connector so as to lock the abutting connectors together.

2. The method of claim 1 further comprising the steps of: placing a drift pin through the openings in abutting connectors; forcing said pin against the tabs to bend said tabs outwardly and downwardly toward the opening of the respective connector; and forcing said pin against both of said tabs to bend the stems of said tabs through the slots and bend the heads over the edges of the respective slots of the abutting openings.

3. An improved L-shaped connector for use with an abutting L-shaped connector having two substantially perpendicular legs forming a corner region to join the corners of ducts, the improved connector comprising: an opening in the corner region of the L-shaped connector, the opening having a wider portion and a slot; and a tab having a stem integrally formed with the connector and a head displaced inwardly from the peripheral edge of the opening to form the wider portion of the opening; the head providing locking means for interlocking the connector with an abutting L-shaped connector when said tab is inserted through the wider portion of the opening and bent over the peripheral edge of the opening around the slot of an abutting connector so as to lock the two abutting connectors together.

4. The improved connector of claim 3 in which a score line is formed at the junction of the stem of the tab and said opening periphery to enable the tab to be easily bent about the score line so as to extend through the wider portion and over the peripheral edge of the slot of the opening in said abutting L-shaped connector to lock the connectors together.

5. A duct joining system for joining ducts each having walls terminating in an open end, said system comprising: two connectors for joining corresponding duct ends, each connector having legs extending from a central portion that has an opening with a peripheral edge that defines a wider portion and a slot and having an inside and an outside surface, the outside surface of one connector abutting the outside surface of the other connector in superimposed relationship when the ducts are joined; the opening in the central portion of each connector being in alignment with the opening in the abutting connector when the ducts are joined; and a tab on each connector integrally formed with the central portion of the connector and extending outwardly from the peripheral edge of the opening, said tab being bent outwardly so as to extend through the wider portion of the opening and into the slot of the abutting connector and over the peripheral edge of the slot in the abutting connector to lock the connectors together.

6. The system of claim 5 in which the legs extend substantially perpendicular to each other to form an L-shaped connector.

7. The system of claim 6 in which the tab extend inwardly from the periphery of the opening along an axis perpendicular to a line extending from the inner corner of the L-shaped connector to the outer corner of the L-shaped connector.

8. The system of claim 6 in which the legs of each L-shaped connector are relatively flat metal strips having the outer edges thereof turned toward the inside surface thereof to provide stiffening ribs.

9. The system of claim 8 in which there is a score line formed on each tab on the side of the connector facing the abutting connector to allow said tab to be bent outwardly about said score line and through and over the edge of the slot in the abutting connector.

* * * * *